United States Patent
Wang et al.

(10) Patent No.: US 11,507,348 B2
(45) Date of Patent: Nov. 22, 2022

(54) METHOD AND APPARATUS FOR GENERATING CHIP-BASED COMPUTING FUNCTION, DEVICE, AND STORAGE MEDIUM

(71) Applicant: Beijing Baidu Netcom Science And Technology Co., LTD., Beijing (CN)

(72) Inventors: Yong Wang, Beijing (CN); Jiaxin Shi, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 428 days.

(21) Appl. No.: 16/711,217

(22) Filed: Dec. 11, 2019

(65) Prior Publication Data
US 2020/0409662 A1 Dec. 31, 2020

(30) Foreign Application Priority Data
Jun. 26, 2019 (CN) .......................... 201910559200.3

(51) Int. Cl.
*G06F 7/544* (2006.01)
*G06N 20/10* (2019.01)
*G06F 11/34* (2006.01)

(52) U.S. Cl.
CPC .......... *G06F 7/544* (2013.01); *G06F 11/3409* (2013.01); *G06N 20/10* (2019.01)

(58) Field of Classification Search
CPC ............................. G06F 7/544; G06F 11/3409
(Continued)

(56) References Cited

U.S. PATENT DOCUMENTS

| 6,594,724 B1 * | 7/2003 | Smith | G06F 3/0613 711/100 |
| 6,768,515 B1 * | 7/2004 | Erten | G06N 3/063 706/15 |

(Continued)

FOREIGN PATENT DOCUMENTS

| KR | 20130021466 A | 3/2013 |
| KR | 20150008185 A | 1/2015 |
| KR | 20160133477 A | 11/2016 |

OTHER PUBLICATIONS

Safaei et al, System-on-a-Chip (SoC)-Based Hardware Acceleration for an Online Sequential Extreme Learning Machine (OS-ELM), IEEE, pp. 2127-2138 (Year: 2019).*

(Continued)

*Primary Examiner* — Anil Khatri
(74) *Attorney, Agent, or Firm* — Weaver Austin Villeneuve & Sampson LLP

(57) ABSTRACT

Embodiments of the present disclosure provide a method and apparatus for generating a chip-based computing function, a device, and a storage medium. The method includes: acquiring an input parameter value associated with a computing function supported by a chip; determining, based on the input parameter value, at least one candidate computing function template corresponding to the computing function, the candidate computing function template having a configurable parameter associated with performance of the candidate computing function template, and the configurable parameter having at least one candidate value; and determining, according to the input parameter value and candidate values of the configurable parameter of the candidate computing function template, a target computing function template and a target value of a configurable parameter of the target computing function template.

23 Claims, 3 Drawing Sheets

(58) Field of Classification Search
USPC .............. 717/136–148; 706/45–52; 708/100
See application file for complete search history.

(56) References Cited

U.S. PATENT DOCUMENTS

| | | | | |
|---|---|---|---|---|
| 6,850,252 | B1 * | 2/2005 | Hoffberg | H04N 21/475 |
| | | | | 380/252 |
| 6,871,341 | B1 * | 3/2005 | Shyr | G06F 8/4441 |
| | | | | 717/131 |
| 7,437,335 | B2 * | 10/2008 | Baum | G06N 20/00 |
| | | | | 706/14 |
| 8,725,667 | B2 * | 5/2014 | Kaushal | G05B 19/4065 |
| | | | | 706/14 |
| 8,879,663 | B1 * | 11/2014 | Haddadin | H03F 3/245 |
| | | | | 708/200 |
| 10,477,271 | B1 * | 11/2019 | Higbee | H04N 21/2668 |
| 10,504,022 | B2 * | 12/2019 | Temam | G06F 9/3887 |
| 10,733,350 | B1 * | 8/2020 | Prasad | G06F 30/33 |
| 10,756,982 | B2 * | 8/2020 | Bai | H04L 41/16 |
| 11,062,201 | B2 * | 7/2021 | Pan | G06F 15/78 |
| 11,119,496 | B1 * | 9/2021 | Ebrahimi Afrouzi | ........ |
| | | | | G05D 1/0217 |
| 2010/0122242 | A1 | 5/2010 | Jiva | |

OTHER PUBLICATIONS

Wang et al., "Re-architecting the On-chip memory Sub-system of Machine-Learning Accelerator for Embedded Devices", ACM, pp. 1-6 (Year: 2016).*

Gonugondla et al, "A Variation-Tolerant In-Memory Machine Learning Classifier via On-Chip Training", IEEE, pp. 3163-3173 (Year: 2018).*

Kuo et al, "Development of Autonomous Navigation Robotic Wheelchairs Using Programmable System-on-Chip Based Distributed Computing Architecture", IEEE, 2939-2944 (Year: 2007).*

Abrol et al., "Implementation of Single Artificial Neuron Using various Activation Functions and XOR Gate on FPGA chip", IEEE, pp. 118-123 (Year: 2015).*

Wang et al, "Cloud Computing and Local Chip-Based Dynamic Economic Dispatch for Microgrids", IEEE, pp. 3774-3784 (Year: 2020).*

Ansari et al, "Performance Evaluation of Various Parameters of Network-On-Chip (NoC) for Different Topologies", IEEE, pp. 1-4 (Year: 2015).*

Jeong et al, "Accurate Machine-Learning-Based On-Chip Router Modeling", IEEE, pp. 62-66 (Year: 2010).*

Korean Decision to Grant Patent dated Aug. 31, 2021 in KR Application No. 10-2020-0003572.

* cited by examiner

METHOD AND APPARATUS FOR GENERATING CHIP-BASED COMPUTING FUNCTION, DEVICE, AND STORAGE MEDIUM

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure mainly relate to the field of chips, and more specifically to a method and apparatus for generating a chip-based computing function, a device, and a computer-readable storage medium.

BACKGROUND

In recent years, artificial intelligence (AI) represented by deep learning technology has been widely used in various fields (such as speech processing, image processing, natural language processing, video processing, and automatic control), and has a profound impact on people's lifestyles. With further development of artificial intelligence technology, people's expectations for the level of artificial intelligence are increasingly high. The level of artificial intelligence mainly depends on the development of deep learning, while the deep learning technology has very high requirements for computing power. The conventional processors are difficult to meet the requirements of deep learning due to the limitations of performance, cost, power consumption and the like. Therefore, how to design high-performance AI chips with deep combination of software and hardware, such as graphics processing units (GPUs) and application-specific integrated circuits (ASICs), to meet the requirements of deep learning technology, is a key problem that needs to be solved now.

SUMMARY

According to example embodiments of the present disclosure, a solution for generating a chip-based computing function is provided.

In a first aspect, an embodiment of the present disclosure provides a method for generating a chip-based computing function. The method includes: acquiring an input parameter value associated with a computing function supported by a chip; determining, based on the input parameter value, at least one candidate computing function template corresponding to the computing function, the candidate computing function template having a configurable parameter associated with performance of the candidate computing function template, and the configurable parameter having at least one candidate value; and determining, according to the input parameter value and candidate values of the configurable parameter of the candidate computing function template, a target computing function template and a target value of a configurable parameter of the target computing function template to implement the chip-based computing function.

In a second aspect, an embodiment of the present disclosure provides an apparatus for generating a chip-based computing function. The apparatus includes: an input parameter value acquiring module, configured to acquire an input parameter value associated with a computing function supported by a chip; a candidate computing function template determining module, configured to determine, based on the input parameter value, at least one candidate computing function template corresponding to the computing function, the candidate computing function template having a configurable parameter associated with performance of the candidate computing function template, and the configurable parameter having at least one candidate value; and a target computing function template determining module, configured to determine, according to the input parameter value and candidate values of the configurable parameter of the candidate computing function template, a target computing function template and a target value of a configurable parameter of the target computing function template to implement the chip-based computing function.

In a third aspect, an embodiment of the present disclosure provides an electronic device including: one or more processors; and a storage apparatus, for storing one or more programs, where the one or more programs, when executed by the one or more processors, cause the one or more processors to implement the method according to the first aspect.

In a fourth aspect, an embodiment of the present disclosure provides a computer readable medium, storing a computer program thereon, where the computer program, when executed by a processor, implements the method according to the first aspect.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference numerals in the drawings denote the same or similar elements.

DETAILED DESCRIPTION OF EMBODIMENTS

Figure 1:
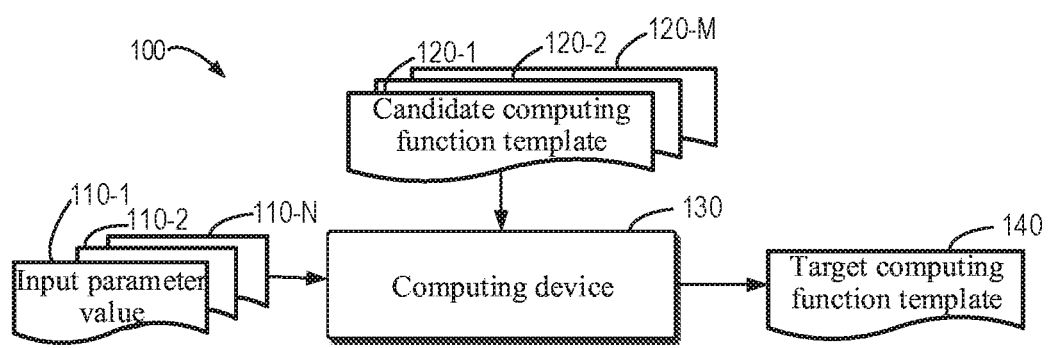
FIG. 1 shows a schematic diagram of an example environment of a solution for generating a chip-based computing function according to some embodiments of the present disclosure.

Embodiments of the present disclosure will be described in more detail below with reference to the accompanying drawings. Although some embodiments of the present disclosure are shown in the drawings, it should be appreciated that the present disclosure may be implemented in various forms and should not be construed as limited to embodiments described here, and these embodiments are provided in turn for more thorough and complete understanding of the present disclosure. It should be understood that the drawings and embodiments of the present disclosure are merely illustrative, but are not intended to limit the scope of the present disclosure.

In the description of embodiments of the present disclosure, the term "include" and the like should be interpreted as open inclusion, i.e., "include but not limited to". The term "based on" should be interpreted as "at least partially based on". The term "one embodiment" or "the embodiment" should be interpreted as "at least one embodiment". The terms "first", "second" and the like may indicate different or identical objects. Other explicit and implicit definitions may also be included below.

As used herein, the term "chip" refers to a carrier that can implement certain function through any existing or future developed software or hardware technology. In some application scenarios, the chip includes, but is not limited to, "crystal", "wafer", "bare chip", "integrated circuit", "monolithic device", "semiconductor device", "microelectronic device", etc.

As used herein, the term "operator" refers to a unit that implements a basic algorithm or function in the chip, and the operator may be implemented by any existing or future developed software or hardware technology. The operator may implement various basic operations in the chip, for example, convolution, various numerical operations, various vector operations, various matrix operations, various character operations, and the like.

As used herein, the term "computing function" refers to a logical unit that implements any computation/operation/algorithm in the chip, the computing function may be implemented by a separate operator or a plurality of operators, and the plurality of operators may be combined by predetermined or dynamically specified logical relationships.

As discussed above, provision of a high-performance chip for deep learning technology is a key problem that needs to be solved now. The conventional deep learning users mainly use some deep learning frameworks, such as tensorflow, caffe, mxnet, pytorch, and paddlepaddle. An AI chip, when applied in the deep learning field, has to be integrated into a framework, and one of the core works is to implement various operators in the framework. The basic operations in the chip are implemented through the operators, for example, convolution, various numerical operations, various vector operations, various matrix operations, various character operations, and the like, while one or more computing functions of the chip are implemented by a separate operator or a combination of operators. The performance of the various computing functions of the chip directly determines the performance of the AI chip.

All major AI chip manufacturers have developed corresponding AI chips based on their respective frameworks, such as Nvida™ GPUs, google™ TPUs, and Baidu™ Kunlun chip. The AI chips have their own instruction sets and programming frameworks, such as CUDA, and OPENCL, and can be programmed in programming languages (e.g., C/C++, C#, Python, etc.).

Although the various operators of the AI chip or the computing functions of embodiments of the present disclosure can be implemented by programming, an underlying chip framework has numerous configurable parameters, for example, how to perform blocking, how to efficiently use various storage spaces (e.g., registers, buffers, memories, shared memories, etc.), and how to schedule programs (e.g., scheduling threads, scheduling processes, etc.). Reasonable configuration of the numerous parameters requires a developer to be very familiar with the underlying chip architecture. Even so, the development cycle required to configure a high-performance AI chip is very long, especially resulting in very low software development efficiency of the AI chip. In addition, the application scenarios/operation scales are rich, and the chip designed for a specific application scenario/operation scale is difficult to achieve optimal performance under different operation scales.

The inventors have noticed that a possible solution for generating a chip-based computing function is to manually implement some general operator libraries to configure underlying parameters of a chip for operators. As previously analyzed, the generation of the chip-based computing function by this solution is difficult and inefficient, and the chip-based computing function cannot be flexibly adapted to various application scenarios/operation scales. Another possible chip design solution is to generate primitives through high-level languages and implement some optimized operator templates by manual coding. This semi-automatic solution of generating chip-based computing functions improves the efficiency of the chip design process, especially chip software development, but this solution shields underlying hardware of the chip framework. Moreover, the performance of the chip depends on the pre-coded optimized operator templates, and thus high-performance operators are difficult to implement. Furthermore, the inventors have also noticed that the chip-based computing functions may also be generated by a full-automatic solution, that is, codes are completely generated by a compiler with the use of a polyhedron compilation technology. In this solution, a user only needs to describe algorithms, and the compiler automatically generates the codes. Although this solution achieves high chip software development efficiency, the possibility of implementation of high-performance codes is reduced because the underlying hardware of the chip framework is completely shielded.

According to embodiments of the present disclosure, a solution for generating a chip-based computing function is proposed. In this solution, the computing function supported by each chip corresponds to at least one candidate computing function template having a configurable parameter associated with the performance of the candidate computing function template, and the configurable parameter has at least one candidate value. After an input parameter value of a computing function is acquired, at least one candidate computing function template may be determined according to the input parameter value, a target computing function template and a target value of a configurable parameter of the target computing function template are determined according to the input parameter value and the candidate value of the configurable parameter of the candidate computing function template, and a chip-based computing function is generated. In this way, the computing function template provides the configurable parameter inside the chip to an upper caller, and the upper caller may dynamically configure the value of the configurable parameter according to the input parameter value, so that the generated chip-based computing function can be dynamically adapted to different application scenarios/operation scales.

Further, in order to better implement a high-performance operator or a computing function of embodiments of the present disclosure, a target computing function template and a target value of a configurable parameter of the target computing function template are determined according to the input parameter value and the candidate value of the configurable parameter of the candidate computing function template by using machine learning in embodiments of the present disclosure. Thus, when the configurable parameter is dynamically configured, the difficulty in manually implementing the computing function template and configuring the underlying parameters of the chip is greatly reduced. In addition, by using machine learning, the design of the chip can still be completed efficiently even in the case of a large search range.

Moreover, in order to better estimate the performance of the candidate computing function template, the test is performed by using just-in-time (JIT) compilation to obtain the performance. In this way, a code is generated during running instead of compiling, thereby improving the efficiency of the chip design process, especially the chip software development, and guaranteeing the design of a high-performance code.

Embodiments of the present disclosure will be described below with reference to the accompanying drawings. It should be noted that, for the purpose of examples only, not for the purpose of limiting the present disclosure, some example embodiments of the present disclosure are exemplified by using a computing function including a single basic function (i.e., a function of an operator) as an example, but it should be understood that the computing function of some embodiments of the present disclosure may include a plurality of operators to implement a combination of the plurality of operator functions.

FIG. 1 shows a schematic diagram of an example environment 100 in which some embodiments of the present disclosure may be implemented. In the example environment 100, a computing device 130 may receive one or more input parameter values 110-1, 110-2 to 110-N associated with a computing function. For convenience of description, the plurality of input parameter values 110-1, 110-2 to 110-N may be collectively referred to as an input parameter value 110. In some example embodiments, the input parameter value 110 may be of any type associated with the computing function. For example, in the case of a computing function for vector multiplication, the input parameter value 110 may describe length values of two vectors executing the vector multiplication, such as "100" and "100". In some example embodiments, the input parameter value 110 may be transmitted to the computing device 130 by way of wired communication or wireless communication. In some example embodiments, the computing device 130 may also receive the input parameter value 110 inputted by a user via an input device (including but not limited to, for example, a mouse, a keyboard, a touch pen, a touch screen, etc.) coupled to the computing device 130.

As shown in FIG. 1, the computing device 130 may also acquire one or more candidate computing function templates 120-1, 120-2 to 120-M for the computing function. For convenience of description, the plurality of candidate computing function templates 120-1, 120-2 to 120-M may be collectively referred to as a candidate computing function template 120.

In some example embodiments, the computing device 130 may acquire the candidate computing function template 120 for the computing function from a candidate computing function template database/memory inside or outside the computing device 130. For example, in the case of a computing function for vector multiplication, the candidate computing function template 120-1 shown in FIG. 1 may be a computing function template for implementing the vector multiplication, the configurable parameter of the computing function template may be a segment size when running the vector multiplication, and the candidate value of the segment size may be [3, 4, 5]. The other candidate computing function template 120-2 may be other computing function template for implementing the vector multiplication, the configurable parameter of the other computing function template may be a number of called processes when running the vector multiplication, and the candidate value of the number of called processes may be [1, 2, 4].

The computing device 130 may determine a target computing function template 140 for the input parameter value 110 and a target value of a configurable parameter corresponding to the target computing function template 140 based on the received input parameter value 110 and the acquired candidate computing function template 120. For example, in the example of FIG. 1, the computing device 130 may determine, by using the solution of generating a chip-based computing function according to embodiments of the present, the target computing function template 140 and the target value of the configurable parameter corresponding to the target computing function template 140 based on the specific application scenario/operation scale of the input parameter value 110 "100, 100" in the case of a computing function for vector multiplication, for example, determine the candidate computing function template 120-1 as the target computing function template 140, and determine the segment size when running the vector multiplication as "4". It should be understood that the input parameter values, the candidate computing function templates, the configurable parameters, and the candidate values of the configurable parameters shown are only provided as examples, and may change according to actual situations. The scope of the present disclosure is not limited in this respect.

Figure 2:
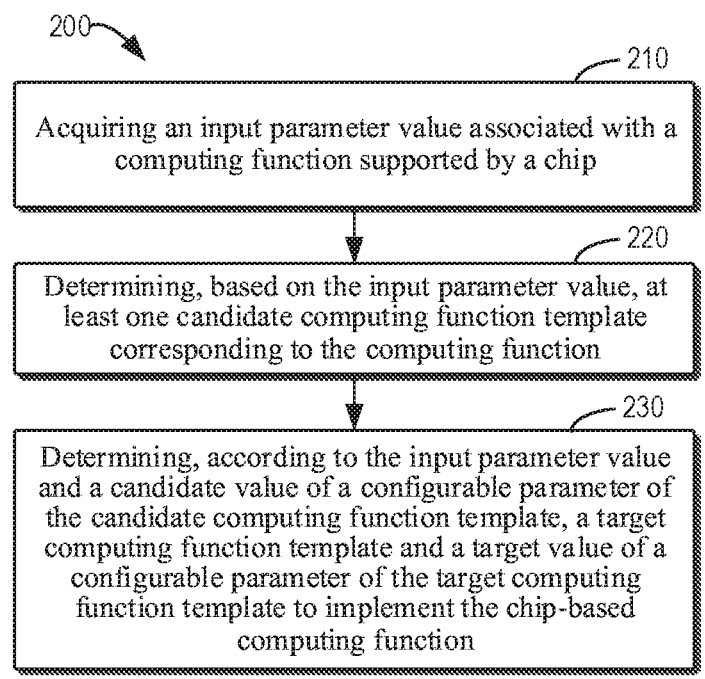
FIG. 2 shows a flowchart of a method for generating a chip-based computing function according to some example embodiments of the present disclosure.

A process for generating a chip-based computing function according to embodiments of the present disclosure will be described in more detail below with reference to FIG. 2. FIG. 2 shows a flowchart of a process 200 for generating a chip-based computing function according to some example embodiments of the present disclosure. The process 200 may be implemented by the computing device 130 of FIG. 1. For ease of discussion, the process 200 will be described in conjunction with FIG. 1.

At block 210, the computing device 130 acquires an input parameter value 110 associated with a computing function supported by a chip. Specifically, the chip may support numerous computing functions. In an embodiment of the present disclosure as a non-limiting example, the computing functions implement basic computing functions of basic operations (e.g., convolution, various numerical operations, various character operations, various matrix operations, various vector operations, encryption, decryption, etc.). The input parameter value 110 may be one or more, depending on different computing functions. Moreover, the input parameter value 110 may be acquired by any way including, but not limited to, by way of user input or by way of reading a script/profile/command file.

In some example embodiments of the present disclosure, the input parameter value 110 may be associated with an application scenario/operation scale. Specifically, the input parameter value 110 may identify the scale of an operation to be implemented by the computing function. For example, the input parameter value 110 may identify the scale of a matrix in the case of a matrix operation, the input parameter value 110 may identify the encryption length of an encryption algorithm in the case of an encryption operation, the input parameter value 110 may identify the vector length in the case of a vector operation, etc. It should be understood that the input parameter value 110 is only provided as an example. In some other implementations, the numerical value, type and the like of the input parameter value 110 may vary, so the type and/or value and the like of the input parameter value 110 should not be limited to the scope of the above examples of the present disclosure, and the input parameter value 110 may be of any suitable type and/or value associated with the application scenario/operation scale of the computing function.

In some example embodiments of the present disclosure, the input parameter value 110 associated with the application scenario/operation scale of the computing function is acquired by the computing device 130, so that the method for generating a chip-based computing function can be flexibly applied to various application scenarios/operation scales, and the generated computing function can be preferably applied to a specific application scenario/operation scale.

At block 220, the computing device 130 determines, based on the input parameter value 110 acquired at block 210, a candidate computing function template 120 corresponding to the computing function. The computing device 130 may use the determined candidate computing function template 120 as a search space for searching the target computing function template 140. The candidate computing function template 120 may be one or more.

In some example embodiments of the present disclosure, each computing function may correspond to at least one candidate computing function template 120, and each candidate computing function template 120 has at least one configurable parameter associated with performance of the candidate computing function template 120, for example, block size, segment size, number of threads, number of processes, register information, memory information, processor information, etc. Each configurable parameter may have at least one candidate value. Under different application scenarios/operation scales, different candidate values of the configurable parameters may cause the designed chip to exhibit different performance. These configurable parameters are usually used as internal parameters of the computing function in the process of generating a chip-based computing function.

In some example embodiments of the present disclosure, at least one candidate computing function template 120 may be designed and implemented for different computing functions by manual coding. Since the candidate computing function template 120 is implemented by manual coding, the execution logic of the candidate computing function template 120 is more accurate, and the candidate computing function template 120 can be better integrated with the underlying framework of the chip to some extent. However, it should be understood that the implementation of the candidate computing function template 120 is not limited to the manual coding shown in embodiments of the present disclosure. In some other example embodiments, the candidate computing function template 120 may also be implemented by automatic or semi-automatic means. In the solution of implementing the candidate computing function template 120 by such automatic or semi-automatic means, the existing historical data/record in optimizing the computing function template or the target computing function template 140/configurable parameter may be referred or combined.

In some example embodiments of the present disclosure, the candidate computing function template 120 is implemented in a low-level programming language, such as a machine-oriented programming language. Additionally or alternatively, in some example embodiments of the present disclosure, the process 200 performed by the computing device 130 is implemented in a low-level programming language, such as a machine-oriented programming language.

Compared to a high-level programming language, the low-level programming language can better interact with the underlying hardware, better exert the performance of hardware, and guarantee the implementation of the computing function of a high-performance chip.

In some example embodiments of the present disclosure, a plurality of candidate templates 120 may be associated with different application scenarios/operation scales. For example, for the computing function of matrix multiplication, the candidate computing function template 120-1 may exhibit good performance in an application scenario 1 (e.g., the size of to-be-multiplied matrix is less than 50*50), and the candidate computing function template 120-2 may exhibit good performance in an application scenario 2 (e.g., the size of to-be-multiplied matrix is more than 100*100). For different computing functions, candidate computing function templates 120 for different application scenarios/operation scales may be designed and implemented to realize customization for different application scenarios/operation scales.

In some example embodiments of the present disclosure, the plurality of candidate computing function templates 120 have arbitrary numbers and values of configurable parameters, and have respective internal processing logics. The candidate computing function template 120 may provide complex configurable parameters inside the chip to an upper caller (e.g., the computing device 130) according to respective internal designs, so that the upper caller can search, configure and test the candidate templates 120 at least partially based on the configurable parameters. In this way, the flexibility of generating a chip-based computing function is improved, manual configuration of the internal parameters of the chip is avoided, the difficulty in the chip design process, especially in the chip software development is reduced, and the rationality and accuracy of configuration of the configurable parameters of the chip are improved.

In some example embodiments of the present disclosure, the candidate computing function template 120 further has a constraint that may define a range of adaptation of the candidate computing function template 120. In some example embodiments of the present disclosure, the constraint may be associated with the input parameter value 110, for example, in a case where a matrix operation is performed, the constraint may be that the matrix size is less than 50*50.

Additionally or alternatively, in some example embodiments of the present disclosure, the constraint may further define the candidate value of the configurable parameter of the candidate computing function template 120. For example, in a case where a matrix operation is performed and the configurable parameter is block size, the constraint may be that the value of the block size is [2, 4, 6].

Additionally or alternatively, in some example embodiments of the present disclosure, the constraint may be associated with both the input parameter value 110 and the configurable parameter. For example, the constraint may be that the operation result of a function using the input parameter value 110 and the value of the configurable parameter as inputs satisfies a predetermined condition, and so on.

It should be understood that the examples of the constraint described in embodiments of the present disclosure are merely exemplary and should not be construed as limiting the constraint. Depending on the specific implementation of different candidate computing function templates 120, the constraint may be any form and any value.

Additionally or alternatively, the computing device 130 determines at least one candidate computing function template 120 corresponding to the computing function based on the input parameter value 110 and the constraint. Since the input parameter value 110 and/or the constraint can reflect the specific application scenario/operation scale to some extent, the determination of the at least one candidate computing function template 120 corresponding to the computing function based on the input parameter value 110 and the constraint can effectively reduce the range of a candidate computing function template 120 to be searched, and improve the efficiency of the chip design process, especially the chip software development.

With continued reference to FIG. 2, at block 230, the computing device 130 determines, according to the input parameter value 110 and different candidate values of the configurable parameter of the candidate computing function template 120 (within the range of the candidate template 120 determined at block 220), a target computing function template 140 and a target value of a configurable parameter of the target computing function template 140 to implement the chip-based computing function.

In some example embodiments of the present disclosure, the computing device 130 determines, according to the input parameter value 110 and a plurality of different candidate values of the configurable parameter of the candidate computing function template 120, the target computing function template 140 and the target value of the configurable parameter of the target computing function template 140 by machine learning.

In some example embodiments of the present disclosure, the computing device 130 estimates the performance of the candidate computing function template 120 under different candidate values of the configurable parameter of the candidate computing function template 120, and determines the target computing function template 140 and the target value of the configurable parameter of the target computing function template 140 based on the estimated performance.

In an illustrative and non-limiting example, the computing device 130 generates an initial measurement set, which may include the input parameter value 110 and/or the value of the configurable parameter of the at least one candidate computing function template 120 determined at block 220. For example, taking multiplication of two vectors as an example, the input parameter value 110 may be an identity of vector length, for example, may be (50, 50), identifying a specific application scenario of multiplication of two vectors having the lengths of 50. The configurable parameter of the candidate computing function template 120-1 is a vector segment length, the candidate value of the segment length is [2, 3, 4], and the constraint is that the operation vector length is less than 100; the configurable parameters of the candidate computing function template 120-2 include a vector segment length and a process number, where the candidate value of the segment length is [3, 4, 5], the candidate value of the process number is [3, 4], and the constraint is that the operation vector length is less than 80. The initial values may be [50, 50, 3, 3], which identifies a specific application scenario for calculating the multiplication of two vectors having the lengths of 50, the segment length parameter used in the operation is 3, and the process number used is 3.

It should be understood that the selection of values of the initial measurement set is merely exemplary, and the number of configurable parameters in the values of the initial measurement set may be adjusted as needed. In some example embodiments, the configurable parameters may include all configurable parameters involved in all the candidate computing function templates 120 determined at block 220. In some other example embodiments, the configurable parameters may include only some of all the configurable parameters involved in all the candidate computing function templates 120 determined at block 220. Similarly, the values of the initial measurement set may also be reasonably set according to the candidate computing function template 120. The present disclosure does not limit this. For example, another example of the candidate computing function template 120 may be an application scenario where two vector lengths are respectively (1000, 1000), i.e., each vector includes 1000 values, the configurable parameters of the candidate computing function template 120 include the number of booted computing kernels (the candidate value is m, where m is a positive integer) and the number of values computed by each computing kernel (the candidate value is n, where n is a positive integer), and the corresponding constraint may be m*n≤1000.

The computing device 130 estimates, according to the initial measurement set, performance of at least one candidate computing function template 120 under the initial measurement set. Specifically, with continued reference to the above example of vector multiplication, the computing device 130 estimates respective performance of the templates 120-1 and 120-2 under the initial measurement set [50, 50, 3, 3].

The computing device 130 generates next measurement parameter set by machine learning. In some example embodiments of the present disclosure, the next measurement parameter set may be selected based on the measurement results of the last measurement parameter set. In addition, the number and value of configurable parameters of the next measurement parameter set are selected in accordance with the initial measurement parameter set, which is not repeated here for the sake of brevity. It should be understood that this operation includes any existing or future developed machine learning technology. The next measurement parameter set is generated by means of machine learning, so that the selection of the next measurement parameter set is more reasonable, the search space corresponding to all candidate values of the configurable parameters does not need to be traversed, and the efficiency of generating a chip-based computing function is improved.

Before the end of the search, the step of generating next measurement parameter set and measuring the performance of the candidate computing function template 120 for the generated measurement parameter set is performed cyclically. Based on the measured performance, the target computing function template 140 and the value of the configurable parameter corresponding to the target computing function template 140 are determined. For example, the measurement results show that the optimal performance result corresponds to the case where the candidate computing function template 120-1 is in the segment length of 3, and the computing device 130 determines the candidate computing function template 120-1 as a target template, and determines the candidate value 3 of the configurable parameter (i.e., the vector segment length) of the candidate computing function template 120-1 as a target value.

In some example embodiments of the present disclosure, the computing device 130 also considers the constraint of the candidate computing function template when determining the target computing function template 140 and the target value of the configurable parameter of the target computing function template 140. Specifically, the constraint of the candidate computing function template 120 may be considered when the initial measurement parameter set and the next measurement parameter set are determined, and when the initial measurement parameter set and the next measurement parameter set are applied to the candidate computing function template 120. By the above way, the determined target computing function template 140 and the determined target value of the configurable parameter of the target computing function template 140 are more efficient and accurate.

By the above way, the configurable parameters inside the chip are provided to the upper caller, and can be dynamically configured according to the test results of performance in the chip software development process, thereby reducing the difficulty in configuring the configurable parameters inside the chip, and guaranteeing the design of the high-performance chip.

Additionally, in some example embodiments of the present disclosure, the computing device 130 may perform tests using JIT compilation to obtain the performance of the candidate computing function template 120. Specifically, the computing device 130 applies the generated measurement parameter to the candidate computing function template 120, generates a final code by JIT, and tests the performance of the candidate computing function template 120. In this way, a code is generated during running instead of compiling, thereby improving the efficiency of the chip design process, especially the chip software development, and guaranteeing the generation of a high-performance chip-based computing function.

In some example embodiments of the present disclosure, the computing device 130 determines the target computing function template 140 and the target value of the configurable parameter of the target computing function template 140 to implement the chip-based computing function, specifically, the computing device 130 outputs a code corresponding to the target computing function template 140 and the target value of the configurable parameter of the target computing function template 140.

In addition, the chip software development process can be controlled in a variety of ways to further improve the efficiency of the chip software development process. In some example embodiments of the present disclosure, the process of generating a chip-based computing function may be controlled by setting a performance threshold. Specifically, in the process of determining the target computing function template 140 and the target value of the target computing function template 140, when the estimated performance is superior to the performance threshold, the candidate computing function template 120 and the candidate value of the configurable parameter of the candidate computing function template 120 corresponding to the performance are determined as the target computing function template 140 and the target value of the configurable parameter of the target computing function template 140 respectively.

The performance threshold may be configured in a variety of ways. In some example embodiments of the present disclosure, the performance threshold may be inputted by a user. In some other example embodiments, the performance threshold may also be a pre-configured default value, and may be pre-stored on the computing device 130.

Additionally or alternatively, in some example embodiments of the present disclosure, the process of generating a chip-based computing function may also be defined within a predetermined period of time. Specifically, the target computing function template 140 and the target value of the configurable parameter of the target computing function template 140 are determined within the predetermined period of time.

The predetermined period of time may be configured in various ways. For example, the predetermined period of time is inputted by the user. Specifically, the user transmits the period of time associated with the design time of the chip to the computing device 130.

Additionally or alternatively, the predetermined period of time may also be determined by the input parameter value 110. For example, the computing device 130 may set different predetermined periods of time for different application scenarios/operation scales. Additionally or alternatively, the predetermined period of time may also be configured by default within the computing device 130.

By the above way, the process of generating a chip-based computing function can be flexibly controlled, and the performance and the efficiency can be better balanced.

Additionally, in some example embodiments of the present disclosure, after determining the target computing function template 140 and the target value, the computing device 130 stores a corresponding relationship between the input parameter value 110 and the determined target computing function template 140 corresponding to the input parameter value 110 as well as the target value of the configurable parameter corresponding to the target computing function template 140.

Additionally, in some example embodiments of the present disclosure, after receiving the input parameter value 110 (as indicated by block 210), the computing device 130 first searches the stored corresponding relationships to determine whether a corresponding relationship corresponding to the input parameter value 110 exists, and directly determines, when it is determined that the corresponding relationship corresponding to the input parameter value 110 exists, the target computing function template 140 corresponding to the input parameter value 110 and the target value of the configurable parameter corresponding to the target computing function template 140 based on the corresponding relationship, to implement the chip-based computing function.

By the above way, the generated chip-based computing function can be dynamically applied to various application scenarios/operation scales, the configurable parameter configured according to the estimated performance is more reliable, and the machine learning method is used to select the measurement parameter set and determine the target operator template and the target value, which reduces the difficulty in manually configuring parameters and can efficiently generate the chip-based computing function.

Figure 3:
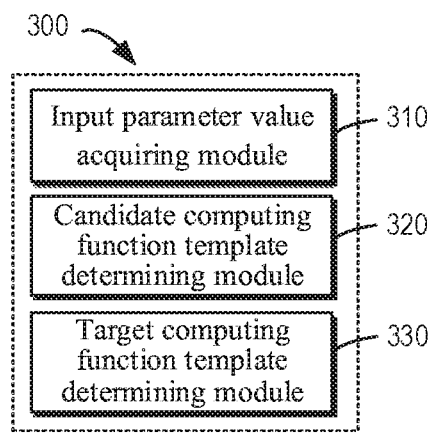
FIG. 3 shows a schematic block diagram of an apparatus for generating a chip-based computing function according to an embodiment of the present disclosure.

FIG. 3 shows a block diagram of an apparatus 300 for generating a chip-based computing function according to an embodiment of the present disclosure. The apparatus 300 may be included in the computing device 130 in FIG. 1 or implemented as the computing device 130. As shown in FIG. 3, the apparatus 300 includes an input parameter value acquiring module 310 configured to acquire an input parameter value 110 associated with a computing function supported by a chip. The apparatus 300 may further include a candidate computing function template determining module 320 configured to determine, based on the input parameter value 110, at least one candidate computing function template 120 corresponding to the computing function, the candidate computing function template 120 has a configurable parameter associated with performance of the candidate computing function template 120, and the configurable parameter has at least one candidate value. Further, the apparatus 300 further includes a target computing function template determining module 330 configured to determine, according to the input parameter value 110 and different candidate values of the configurable parameter of the candidate computing function template 120, a target computing function template 140 and a target value of a configurable parameter of the target computing function template 140 to implement the chip-based computing function.

In some example embodiments of the present disclosure, the target computing function template determining module 330 includes: a machine learning module configured to determine, according to the input parameter value 110 and a plurality of different candidate values of the configurable parameter of the candidate computing function template 120, the target computing function template 140 and the target value of the configurable parameter of the target computing function template 140 by machine learning.

In some example embodiments of the present disclosure, the target computing function template determining module 330 includes: a performance estimating module, configured to estimate the performance of the candidate computing function template 120 under different candidate values of the configurable parameter of the candidate computing function template 120; and a second target computing function template determining module, configured to determine the target computing function template 140 and the target value of the configurable parameter of the target computing function template 140 based on the estimated performance.

In some example embodiments of the present disclosure, the second target computing function template determining module includes: a threshold judging module, configured to determine whether the estimated performance is superior to a performance threshold; and a third target computing function template determining module, configured to determine, in response to determining that the estimated performance is superior to the performance threshold, the candidate computing function template 120 and the candidate value of the configurable parameter of the candidate computing function template 120 corresponding to the estimated performance as the target computing function template 140 and the target value of the configurable parameter of the target computing function template 140 respectively.

In some example embodiments of the present disclosure, the performance threshold is inputted by a user or pre-configured by the computing device 130.

In some example embodiments of the present disclosure, the performance estimating module includes: a parameter application module, configured to apply the input parameter value 110 and at least one candidate value of at least one configurable parameter to the at least one candidate computing function template 120; and a compiling module, configured to generate a code of the at least one candidate computing function template 120 by means of just-in-time compilation and estimate the performance of the at least one candidate computing function template 120.

In some example embodiments of the present disclosure, the candidate computing function template 120 further has a constraint associated with the input parameter value 110 and/or the configurable parameter associated with the performance of the candidate computing function template 120; and the candidate computing function template determining module 320 includes: a first candidate computing function template determining module, configured to determine at least one candidate computing function template 120 corresponding to the computing function based on the input parameter value 110 and the constraint.

In some example embodiments of the present disclosure, the apparatus 300 further includes: a storage module, configured to store a corresponding relationship between the input parameter value 110 and the determined target computing function template 140 corresponding to the input parameter value 110 as well as the target value of the configurable parameter corresponding to the target computing function template 140.

In some example embodiments of the present disclosure, the apparatus 300 further includes: a corresponding relationship judging module configured to determine, based on the input parameter value 110, whether a corresponding relationship corresponding to the input parameter value 110 exists in the stored corresponding relationship before determining at least one candidate computing function template 120 corresponding to the computing function; and a fourth target computing function template determining module configured to determine, in response to determining that the corresponding relationship corresponding to the input parameter value 110 exists, the target computing function template 140 corresponding to the input parameter value 110 and the target value of the configurable parameter corresponding to the target computing function template 140 based on the corresponding relationship.

In some example embodiments of the present disclosure, the target computing function template determining module 330 includes: a fifth target computing function template determining module, configured to determine the target computing function template 140 and the target value of the configurable parameter of the target computing function template 140 within a predetermined period of time.

In some example embodiments of the present disclosure, the predetermined period of time is determined based on at least one of: a period of time inputted by a user and associated with a design time of the chip; the input parameter value 110; or a period of time pre-configured by the computing device 130 and associated with the design time of the chip.

In some example embodiments of the present disclosure, at least one candidate computing function template 120 is implemented in a machine-oriented programming language.

In some example embodiments of the present disclosure, each computing function corresponds to a plurality of candidate computing function templates 120, and the plurality of candidate computing function templates 120 correspond to different application scenarios.

In some example embodiments of the present disclosure, the input parameter value 110 is associated with an application scenario.

Figure 4:
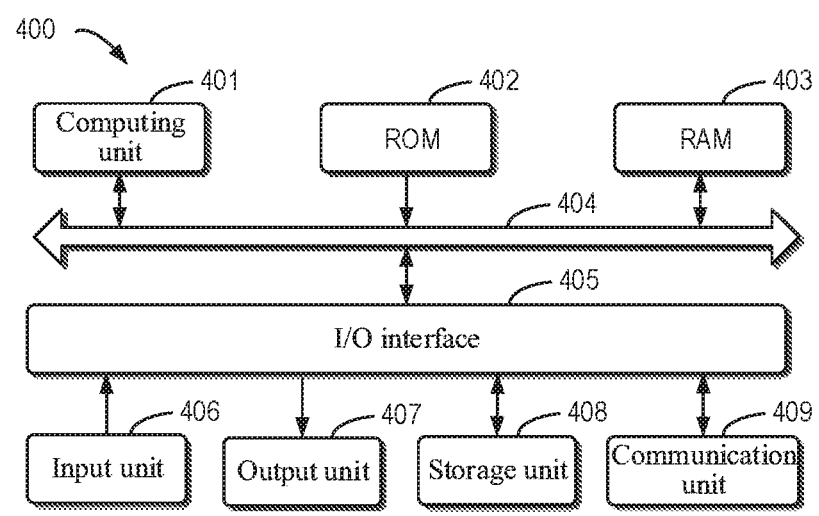
FIG. 4 shows a block diagram of a computing device capable of implementing some embodiments of the present disclosure.

FIG. 4 shows a schematic block diagram of an example device 400 that can be used to implement embodiments of the present disclosure. The device 400 can be used to implement the computing device 130 of FIG. 1. As shown in the figure, the device 400 includes a computing unit 401, which may execute various appropriate operations and processes based on computer program instructions stored in a read-only memory (ROM) 402 or computer program instructions loaded from a storage unit 408 to a random access memory (RAM) 403. The RAM 403 may also store various programs and data required by the operations of the device 400. The computing unit 401, the ROM 402, and the RAM 403 are connected to each other through a bus 404. An input/output (I/O) interface 405 is also connected to the bus 404.

A plurality of components in the device 400 are connected to the I/O interface 404, including: an input unit 406, e.g., a keyboard, a mouse, etc.; an output unit 407, e.g., various types of displays, speakers, etc.; a storage unit 408, e.g., a magnetic disk, an optical disk, etc.; and a communication unit 409, e.g., a network card, a modem, a wireless communication transceiver, etc. The communication unit 409 allows the device 400 to exchange information/data with other devices over a computer network such as the Internet and/or various telecommunication networks.

The computing unit 401 may be a variety of general-purpose and/or dedicated processing components with processing and computing capabilities. Some examples of the computing unit 401 include, but are not limited to, a central processing unit (CPU), a graphics processing unit (GPU), various specialized artificial intelligence (AI) computing chips, various computing units that run machine learning model algorithms, a digital signal processor (DSP), and any suitable processor, controller, microcontroller, etc. The computing unit 401 executes the various methods and processes described above, such as the process 200. For example, in some example embodiments, the process 200 may be implemented as a computer software program that is tangibly contained in a machine-readable medium, for example, in the storage unit 408. In some example embodiments, some or all of the computer program may be loaded and/or installed to the device 400 via the ROM 402 and/or the communication unit 409. When the computer program is loaded to the RAM 403 and executed by the computing unit 401, one or more steps of the process 200 described above may be executed. Alternatively, in other embodiments, the computing unit 401 may be configured to execute the process 200 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multi-tasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for generating a chip-based computing function, comprising:
   acquiring an input parameter value associated with a computing function supported by a chip;
   determining, based on the input parameter value, at least one candidate computing function template corresponding to the computing function, the candidate computing function template having a configurable parameter associated with performance of the candidate computing function template, and
   the configurable parameter having at least one candidate value, wherein the performance of the candidate computing function template is estimated by:
      generating a first measurement parameter set including at least the configurable parameter;
      estimating, according to the first measurement parameter set, performance of the determined at least one candidate computing function template;
      generating a next measurement parameter set based on the estimated performance according to the first measurement parameter set by machine learning; and
      estimating, according the next measurement parameter set, performance of the determined at least one candidate computing function template,
      wherein estimating the performance of the determined at least one candidate computing function template comprises: applying the input parameter value and at least one candidate value of the configurable parameter to the at least one candidate computing function template,
      generating a code of the at least one candidate computing function template by means of just-in-time compilation, and executing the code; and
   determining, according to the input parameter value and candidate values of the configurable parameter of the candidate computing function template, a target computing function template and a target value of a configurable parameter of the target computing function template to implement the chip-based computing function.

2. The method according to claim 1, wherein the determining, according to the input parameter value and candidate values of the configurable parameter of the candidate computing function template, a target computing function template and a target value of a configurable parameter of the target computing function template comprises:
  determining, according to the input parameter value and a plurality of different candidate values of the configurable parameter of the candidate computing function template, the target computing function template and the target value of the configurable parameter of the target computing function template by machine learning.

3. The method according to claim 1, wherein the determining, according to the input parameter value and candidate values of the configurable parameter of the candidate computing function template, a target computing function template and a target value of a configurable parameter of the target computing function template comprises:
  estimating the performance of the candidate computing function template under different candidate values of the configurable parameter of the candidate computing function template; and
  determining the target computing function template and the target value of the configurable parameter of the target computing function template based on the estimated performance.

4. The method according to claim 3, wherein the determining the target computing function template and the target value of the configurable parameter of the target computing function template based on the estimated performance comprises:
  determining whether the estimated performance is superior to a performance threshold; and
  determining, in response to determining that the estimated performance is superior to the performance threshold, the candidate computing function template and the candidate value of the configurable parameter of the candidate computing function template corresponding to the estimated performance as the target computing function template and the target value of the configurable parameter of the target computing function template respectively.

5. The method according to claim 4, wherein the performance threshold is inputted by a user or pre-configured by an apparatus for chip design.

6. The method according to claim 1, wherein the candidate computing function template further has a constraint associated with the input parameter value and/or the configurable parameter associated with the performance of the candidate computing function template;
  wherein the determining at least one computing function template corresponding to the computing function comprises:
    determining at least one candidate computing function template corresponding to the computing function based on the input parameter value and the constraint.

7. The method according to claim 1, further comprising:
  storing a corresponding relationship between the input parameter value and the determined target computing function template corresponding to the input parameter value as well as the target value of the configurable parameter corresponding to the target computing function template.

8. The method according to claim 7, further comprising:
  determining, based on the input parameter value, whether a corresponding relationship corresponding to the input parameter value exists in the stored corresponding relationship before determining at least one candidate computing function template corresponding to the computing function; and
  the determining the target computing function template and the target value of the configurable parameter of the target computing function template comprises:
    determining, in response to determining that the corresponding relationship corresponding to the input parameter value exists, the target computing function template corresponding to the input parameter value and the target value of the configurable parameter corresponding to the target computing function template based on the corresponding relationship.

9. The method according to claim 1, wherein the determining the target computing function template and the target value of the configurable parameter of the target computing function template comprises:
  determining the target computing function template and the target value of the configurable parameter of the target computing function template within a predetermined period of time.

10. The method according to claim 9, wherein the predetermined period of time is determined based on at least one of:
  a period of time inputted by a user and associated with a design time of the chip;
  the input parameter value; or
  a period of time pre-configured by an apparatus for chip design and associated with the design time of the chip.

11. The method according to claim 1, wherein each computing function corresponds to a plurality of candidate computing function templates, and the plurality of candidate computing function templates correspond to different application scenarios, wherein the input parameter value is associated with an application scenario.

12. An apparatus for chip design, comprising:
  at least one processor; and
  a memory storing instructions, the instructions when executed by the at least one processor, cause the at least one processor to perform operations, the operations comprising:
  acquiring an input parameter value associated with a computing function supported by a chip;
  determining, based on the input parameter value, at least one candidate computing function template corresponding to the computing function,
  the candidate computing function template having a configurable parameter associated with performance of the candidate computing function template, and
  the configurable parameter having at least one candidate value, wherein the performance of the candidate computing function template is estimated by:
    generating a first measurement parameter set including at least the configurable parameter;
    estimating, according to the first measurement parameter set, performance of the determined at least one candidate computing function template;

generating a next measurement parameter set based on the estimated performance according to the first measurement parameter set by machine learning; and estimating, according the next measurement parameter set, performance of the determined at least one candidate computing function template, wherein estimating the performance of the determined at least one candidate computing function template comprises: applying the input parameter value and at least one candidate value of the configurable parameter to the at least one candidate computing function template, generating a code of the at least one candidate computing function template by means of just-in-time compilation, and executing the code; and determining, according to the input parameter value and candidate values of the configurable parameter of the candidate computing function template, a target computing function template and a target value of a configurable parameter of the target computing function template to implement the chip-based computing function.

13. The apparatus according to claim 12, wherein the determining, according to the input parameter value and candidate values of the configurable parameter of the candidate computing function template, a target computing function template and a target value of a configurable parameter of the target computing function template comprises:

determining, according to the input parameter value and a plurality of different candidate values of the configurable parameter of the candidate computing function template, the target computing function template and the target value of the configurable parameter of the target computing function template by machine learning.

14. The apparatus according to claim 12, wherein the determining, according to the input parameter value and candidate values of the configurable parameter of the candidate computing function template, a target computing function template and a target value of a configurable parameter of the target computing function template comprises:

estimating the performance of the candidate computing function template under different candidate values of the configurable parameter of the candidate computing function template; and determining the target computing function template and the target value of the configurable parameter of the target computing function template based on the estimated performance.

15. The apparatus according to claim 14, wherein the determining the target computing function template and the target value of the configurable parameter of the target computing function template based on the estimated performance comprises:

determining whether the estimated performance is superior to a performance threshold; and determining, in response to determining that the estimated performance is superior to the performance threshold, the candidate computing function template and the candidate value of the configurable parameter of the candidate computing function template corresponding to the estimated performance as the target computing function template and the target value of the configurable parameter of the target computing function template respectively.

16. The apparatus according to claim 15, wherein the performance threshold is inputted by a user or pre-configured by an apparatus for chip design.

17. The apparatus according to claim 12, wherein the candidate computing function template further has a constraint associated with the input parameter value and/or the configurable parameter associated with the performance of the candidate computing function template;

wherein the determining at least one computing function template corresponding to the computing function comprises:

determining at least one candidate computing function template corresponding to the computing function based on the input parameter value and the constraint.

18. The apparatus according to claim 12, the operations further comprising:

storing a corresponding relationship between the input parameter value and the determined target computing function template corresponding to the input parameter value as well as the target value of the configurable parameter corresponding to the target computing function template.

19. The apparatus according to claim 18, the operations further comprising:

determining, based on the input parameter value, whether a corresponding relationship corresponding to the input parameter value exists in the stored corresponding relationship before determining at least one candidate computing function template corresponding to the computing function; and determining, in response to determining that the corresponding relationship corresponding to the input parameter value exists, the target computing function template corresponding to the input parameter value and the target value of the configurable parameter corresponding to the target computing function template based on the corresponding relationship.

20. The apparatus according to claim 12, wherein the determining the target computing function template and the target value of the configurable parameter of the target computing function template comprises:

determining the target computing function template and the target value of the configurable parameter of the target computing function template within a predetermined period of time.

21. The apparatus according to claim 20, wherein the predetermined period of time is determined based on at least one of:

a period of time inputted by a user and associated with a design time of the chip;

the input parameter value; or a period of time pre-configured by the apparatus for chip design and associated with the design time of the chip.

22. The apparatus according to claim 12, wherein each computing function corresponds to a plurality of candidate computing function templates, and the plurality of candidate computing function templates correspond to different application scenarios, wherein the input parameter value is associated with an application scenario.

23. A non-transitory computer-readable storage medium, storing a computer program, wherein the computer program, when executed by a processor, causes the processor to perform operations, the operations comprising:

acquiring an input parameter value associated with a computing function supported by a chip;

determining, based on the input parameter value, at least one candidate computing function template corresponding to the computing function, the candidate computing function template having a configurable parameter associated with performance of the candidate computing function template, and the configurable parameter having at least one candidate value, wherein the performance of the candidate computing function template is estimated by:

generating a first measurement parameter set including at least the configurable parameter;

estimating, according to the first measurement parameter set, performance of the determined at least one candidate computing function template;

generating a next measurement parameter set based on the estimated performance according to the first measurement parameter set by machine learning; and estimating, according the next measurement parameter set, performance of the determined at least one candidate computing function template, wherein estimating the performance of the determined at least one candidate computing function template comprises: applying the input parameter value and at least one candidate value of the configurable parameter to the at least one candidate computing function template, generating a code of the at least one candidate computing function template by means of just-in-time compilation, and executing the code; and determining, according to the input parameter value and candidate values of the configurable parameter of the candidate computing function template, a target computing function template and a target value of a configurable parameter of the target computing function template to implement the chip-based computing function.

\* \* \* \* \*

UNITED STATES PATENT AND TRADEMARK OFFICE
CERTIFICATE OF CORRECTION

| | |
|---|---|
| PATENT NO. | : 11,507,348 B2 |
| APPLICATION NO. | : 16/711217 |
| DATED | : November 22, 2022 |
| INVENTOR(S) | : Yong Wang and Jiaxin Shi |

Page 1 of 1

It is certified that error appears in the above-identified patent and that said Letters Patent is hereby corrected as shown below:

On the Title Page

Item (73), Assignee, delete "Beijing Baidu Netcom Science and Technology Co., Ltd." and insert -- Beijing Baidu Netcom Science and Technology Co., Ltd., Beijing (CN); Kunlunxin Technology (Beijing) Company Limited, Beijing (CN) --, therefor.

Signed and Sealed this
Twenty-fourth Day of September, 2024

Katherine Kelly Vidal
*Director of the United States Patent and Trademark Office*